United States Patent [19]
Hildreth

[11] 4,184,001

[45] Jan. 15, 1980

[54] MULTI LAYER INSULATION SYSTEM FOR CONDUCTORS COMPRISING A FLUORINATED COPOLYMER LAYER WHICH IS RADIATION CROSS-LINKED

[75] Inventor: Nelson Hildreth, Winooski, Vt.

[73] Assignee: Haveg Industries, Inc., Marshallton, Del.

[21] Appl. No.: 897,967

[22] Filed: Apr. 19, 1978

[51] Int. Cl.[2] ........................ B05D 3/06; B32B 15/02; B32B 15/08; B32B 27/08; H01B 3/30

[52] U.S. Cl. ............................ 428/383; 174/120 SR; 427/35; 427/36; 427/118; 428/421

[58] Field of Search .................. 174/110 SR, 120 SR; 427/118, 35, 36; 428/383, 421

[56] References Cited

U.S. PATENT DOCUMENTS

| | | | |
|---|---|---|---|
| 3,168,417 | 2/1965 | Smith et al. | 427/118 |
| 3,269,862 | 8/1966 | Lanza et al. | 428/383 |
| 3,422,215 | 1/1969 | Humes | 174/120 SR |
| 3,579,370 | 5/1971 | Punderson et al. | 427/118 |
| 3,650,827 | 3/1972 | Brown et al. | 428/383 |
| 3,805,218 | 4/1974 | Voida | 174/120 SR |
| 4,031,167 | 6/1977 | Arnoff et al. | 427/118 |
| 4,062,998 | 12/1977 | Hagiwara et al. | 428/383 |

*Primary Examiner*—J. C. Cannon
*Attorney, Agent, or Firm*—Michael B. Keehan

[57] ABSTRACT

An insulation system for electrical conductors is provided. The insulation system has a layer of polymer selected from ethylene-tetrafluoroethylene copolymer, ethylene-chlorotrifluoroethylene copolymer and ethylene-tetrafluoroethylene terpolymer surrounding the conductor. This layer of polymer is irradiation crosslinked with from 3 to 20 megarads of high energy ionizing irradiation. Bonded to the surface of the irradiation crosslinked layer of polymer is a polyimide coating. The insulation is a high temperature, flame resistant system having a combination of properties useful in the aircraft industry as airframe and hookup wire.

11 Claims, 1 Drawing Figure

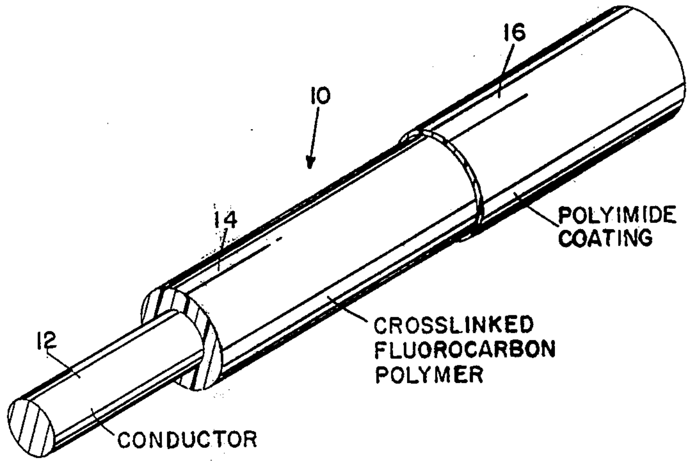
16
10
14
POLYIMIDE
COATING
12
CROSSLINKED
FLUOROCARBON
POLYMER
CONDUCTOR

MULTI LAYER INSULATION SYSTEM FOR CONDUCTORS COMPRISING A FLUORINATED COPOLYMER LAYER WHICH IS RADIATION CROSS-LINKED

This invention relates to a new insulation system for electrical conductors having a unique combination of properties that make it particularly suitable for use in high temperature applications wherein abrasion resistance is necessary. In another aspect, this invention relates to a process for preparing an irradiation cross-linked insulation having unique properties.

There is a need for a good, high temperature, flame retardant, abrasion resistant and lightweight insulation system primarily for use in the aircraft industries airframe and hookup wire. Currently the aircraft industry is using very expensive materials such as polyimides or filled polytetrafluoroethylene insulation systems. Polyimide enamels have also been used on various insulation systems to improve such systems with respect to abrasion resistance but most of such systems have poor high temperature cut-through resistance.

It has been found in accordance with this invention that ethylene-tetrafluoroethylene copolymer or terpolymer, or ethylene-chlorotrifluoroethylene copolymer, when irradiated with high energy ionizing radiation and subsequently coated with a heat curable polyimide enamel, as hereinafter defined, provides an insulation material which has a unique combination of properties including good resistance to flame, scrape abrasion, high temperature cut-through resistance, plus good electrical properties, low smoke, low corrosivity, and easy strippability.

The drawing and the detailed description which follows illustrate this invention. The drawing illustrates only a typical embodiment of this invention.

BRIEF DESCRIPTION OF THE DRAWING

The drawing shows a segment of a cable insulated with the insulation system of this invention having the insulating layers cut away for purposes of illustration.

DESCRIPTION OF THE DRAWING

Referring to the drawing, there is shown a cable generally designated as 10 having an inner wire conductor 12 which typically may be copper, tin-clad copper, copper alloy, or the like. Conductor 12 can be either stranded or solid. Covering the conductor 12 is a first layer of polymeric insulation 14 which is radiation crosslinked ethylene-tetrafluoroethylene copolymer or terpolymer, or ethylene-chloro-trifluoroethylene copolymer. Covering the layer of insulation is a layer of polyimide enamel.

The layer of polymeric insulation must be crosslinked by high energy irradiation. Crosslinking can be conducted either before or after the polymeric layer of insulation is coated with polyimide.

DESCRIPTION OF EMBODIMENTS

A detailed description of the method for manufacturing the insulation system of this invention follows. In the description of the method, ethylene-tetrafluoroethylene copolymer is employed as the first layer of polymeric insulation. The method is the same, however, when employing ethylene-tetrafluoroethylene terpolymer or ethylene-chloro-trifluorotrifluoroethylene copolymer. In the ethylene-tetrafluoroethylene terpolymer, a broad range of ethylenically unsaturated monomers can be employed as the third monomer in the terpolymer.

Ethylene-tetrafluoroethylene copolymer in any suitable form, such as pellets, chips or powder, is charged to the feed section of an extruder and heated to form a viscous fluid. The conductor being insulated is generally preheated to about 250° F. prior to coating with the polymer. The ethylene-tetrafluoroethylene copolymer emerges from the die as a viscous liquid having a tubular shape and it is drawn down on the conductor using a suitable draw down ratio. For example, to insulate a 24 gauge (AWG) conductor having an outside diameter of 0.024 inch with 0.007 inch of ethylene-tetrafluoroethylene the ethylene-tetra-fluoroethylene copolymer is extruded through an annular die which has an inside diameter of 0.096 inch and an outside diameter of 0.144 inch. The extruding tubular copolymer is drawn down on the conductor using a draw down ratio of 7:1. Conductors of other sizes can be insulated with the copolymers described herein and the thickness of the layer of polymeric insulation can be varied by changing die sizes and the draw down ratio.

Typically, an extruder for the fluorocarbon polymers employed in the insulation system of this invention has a feed section, center section and die section and is operated with the feed section at about 215° F., the center section at about 680° F. and the front or die section of the extruder at about 630° F. After the first layer of polymeric insulation is extruded through the die and drawn down onto the conductor, the insulated conductor is quenched in a cold water bath.

After the wire is insulated with the first layer of polymeric insulation, this layer is crosslinked by exposing the insulated wire to high energy ionizing irradiation such as radiation from a high voltage electron accelerator, x-rays, gamma rays from a source such as Cobalt 60, and the like. The preferred source of high energy ionizing irradiation is a high voltage electron accelerator. The radiation time necessary to effect crosslinking for a typical high voltage electron accelerator can vary from about 2 seconds to about 60 seconds. The total radiation dose must be controlled, however, to between 3 and 20 megarads. Preferred conditions for irradiating the first layer of polymeric insulation using an electron accelerator are 6 seconds and a total radiation dose of 10 megarads (a radiation intensity of 1.66 megarads per second).

If desired, prior to irradiation the layer of polymeric insulation can be coated with polyimide enamel and the polyimide coated insulation subjected to high energy irradiation to effect crosslinking of the polymer. Polyimide enamel is highly resistant to crosslinking by irradiation and therefore no substantial change occurs in the polyimide enamel during irradiation.

The polyimide is applied to the surface of the polymeric insulation by any suitable method such as dipping or spraying. The resulting wire is passed through a series of ovens in which the polyimide coating on the wire is dried and cured. The curing step results in removal of solvent from the polyimide and it can be accomplished in a single continuous operation or in multiple passes through an oven. Similarly, the curing step can be done in a batch-wise operation in which a coil of wire is placed in an oven for periods of time ranging from $\frac{1}{4}$ hour to 4 hours at a temperature of about 400° F. The thickness of the polyimide coating on the cross-linked polymer can be controlled by passing the polyimide coated wire through a series of sizing dies. To achieve desirable cut through resistance for the insulation system of this invention, the thickness of the polyimide enamel coating must be at least about 0.0005 inch thick. The preferred thickness of the polyimide coating is about 0.001 inch thick. Thicker polyimide coatings up to about 0.002 inch can be applied.

It is desirable to treat the surface of the polymeric insulation after it has been crosslinked by irradiation to activate it prior to applying with polyimide enamel to the surface of the insulation. One method of activating the polymeric insulation is to contact its surface with a material such as lithium, sodium, or a solution of an alkali metal such as sodium or potassium in liquid anhydrous ammonia, or for example 1% of sodium to 10% sodium in liquid anhydrous ammonia, or a solution, e.g., a 5% solution of sodium metal in molten naphthalene or sodium naphthalene dissolved in tetrahydrofuran. Such materials etch the surface of the polymeric insulation and result in improvement of the adhesion or bonding of polyimide enamel to the polymeric insulation.

The crosslinked polymeric insulation which is employed in the insulation system of this invention is prepared by irradiating a polymeric material selected from ethylene-tetrafluoroethylene copolymer (available commercially and sold under the trademark TEFZEL 200 from E. I. du Pont de Nemours & Co.), ethylene-tetrafluoroethylene terpolymer (available commercially and sold under the trademark TEFZEL 280 from E. I. du Pont de Nemours & Co.), and ethylene-chlorotrifluoroethylene copolymer (available commercially and sold under the trademark HALAR from the Allied Chemical Company).

The polymers which can be crosslinked by irradiation to form the first layer in the insulation system of this invention may contain minor amounts of crosslinking agents such as the triallyl esters of cyanuric and isocyanuric acid. Other crosslinking agents such as those disclosed in U.S. Pat. No. 4,031,167 can also be incorporated in the polymer. Such crosslinking agents are employed in amounts of from about 1% to about 10% by weight, based on the weight of the polymer.

The polyimide enamel used to coat the radiation crosslinked polymeric insulations of this invention are heat curable polymeric imides having (1) an aromatic carbon ring, e.g., a benzene or naphthalene ring system, and (2) the heterocyclic linkage comprising a 5 or 6-membered ring containing one or more nitrogen atoms and double bonded carbon to carbon and/or carbon to nitrogen and/or carbonyl groups. Preferably, there are essentially no nonaromatic carbon atoms with hydrogen atoms attached hereto. The polymeric imides are resins and are in general linear polymers that are extremely high melting by virtue of their high molecular weight and strong intermolecular attraction. Exemplary polyimide materials which can be employed in preparing the insulated wire of this invention are disclosed in U.S. Pat. No. 3,168,417. The polyimide materials disclosed in said patent, particularly the polyimides described in columns 2, 3 and 4 are specifically incorporated herein by reference. Polyimides prepared by condensation of aromatic diamines such as 4,4-oxydianiline and pyromellitic dianhydrides are suitable for use in the insulation system of this invention.

The polyimides are applied to the polymeric insulation in the form of a solution. Any convenient solvent for the polyimides such as formic acid, dimethylsulfoxide, sulfuric acid, and N-methylpryyolidone, and N-methylcaprolactan, dimethylacetamide, and the like, may be employed as solvents for the polyimide.

A preferred polyimide for use in the insulation system of this invention is available commercially from E. I. duPont de Nemours & Co. and is sold under the trade name LIQUID H.

EXAMPLE 1

Conductors coated with the insulation system of this invention, following the procedures heretofore described, are evaluated. Nineteen strands of wire, each having a diameter of 0.0079 inch, are stranded to form a conductor (20 AWG) having a diameter of 0.037 inch. The stranded conductor is jacketed with a first layer of polymeric insulation having a thickness of 0.010 inch. The polymeric insulation employed is ethylene-chlorotrifluoroethylene copolymer. The polymeric insulation is then irradiated with high voltage electrons from an electron accelerator for 6 seconds. The total radiation dose was 10 megarads. The surface of the polymeric insulation is treated with a mixture of sodium (1–3%) in anhydrous ammonia to improve surface adhesion of the polymeric insulation. Following irradiation and surface treatment the crosslinked polymeric insulation is coated with polyimide to a thickness of 0.001 inch. The polyimide is applied as a 12% solution in normal methylpyrrolidone solvent. The polyimide employed is the condensation product of an aromatic diamine and pyromellitic anhydride. The resulting insulated conductor is evaluated for various properties. A comparison of certain properties of the insulated conductor of this invention and the same conductor insulated with the same thickness of uncrosslinked ethylene-chlorotrifluoroethylene copolymer and irradiation crosslinked ethylene-chlorotrifluoroethylene copolymer (same processing and conditions described above) are set forth in Table I below.

Table I

| Property | Test | Uncross-linked ECTFE (1) | Cross-linked ECTFE | Cross-linked ECTFE and Polyimide (2) |
|---|---|---|---|---|
| Cut through Resistance at 23° C. | "Dynamic Cut Through Test"; using Instron Tester; 0.005 inch radius blade | — | 50 lbs. | 91.6 lbs. |
| Cut through Resistance at 200° C. | "Dynamic Cut Through Test"; using Instron Tester; 0.005 inch radius blade | — | 2.6 lbs. | 21 lbs. |
| Abrasion | Mil-W-22759; para. 4.7.5.12 | — | 21.9 in. | 45.5 in. |
| Accelerated Aging for 7 | Mil-W-22759 | Fail | Pass | Pass |

Table I-continued

| Property | Test | Uncross-linked ECTFE (1) | Cross-linked ECTFE | Cross-linked ECTFE and Polyimide (2) |
|---|---|---|---|---|
| hrs. at 210° C. | | | | |

(1) ECTFE is ethylene-chlorotrifluoroethylene.
(2) Polyimide is sold under the trade name LIQUID H.

EXAMPLE 2

A conductor as described in Example 1 is insulated with a first layer of polymeric insulation which is modified ethylene-tetrafluoroethylene copolymer, sold under the trade mark TEFZEL 280. All of the conditions and parameters for insulation of the conductor as described in Example 1 are followed. The properties of the resulting insulated conductor were evaluated. The results of this evaluation are set forth in Table II below.

Table II

| Property | Test | Result |
|---|---|---|
| Deformation | U.L. 758; except 275° C. and 250 grams weight | 70% |
| Tensile | U.L. 758 | 5386 psi |
| Elongation | U.L. 758 | 150% |
| Shrinkage | Mil-W-22759; para. 4.7.5.10; test temp. 250° C. | 0 |
| INsulation Resistance | Mil-W-22759; para. 4.7.5.2 | α |
| Abrasion Resistance | Mil-W-22759; para. 4.7.5.12.2 | 73.5 inches |
| Accelerated Aging | Mil-W-81044/9; except tested at 250° C. | Pass |

EXAMPLE 3

Following the same procedures and using the same conductor and insulation sizes and conditions specified in Example 1, a stranded wire was insulated with the insulation system of this invention employing ethylene-trifluoroethylene copolymer as the polymeric layer. For control purposes certain properties of the insulation system of this invention were compared to insulated wire prepared under the same conditions and using the same conductor and polymeric insulation thicknesses and polyimide thickness as described in Example 1. The results of this evaluation are the average results from four tests of each property evaluated and are set forth in Table III below.

Table III

| Property | Test | ETFE Insulation | Cross-linked ETFE(1) | ETFE Insulation and Polyimide | Cross-linked ETFE and Polyimide |
|---|---|---|---|---|---|
| Scrape Abrasion | Mil-W-22759 para. 4.7.5., 4.1 except 3 lb. weight | 19.3 | 6.0 | — | 79.3 |
| Deformation | U.L. 758, except 250 grams, 275° C. | — | — | 100% | 70% |
| Cut through Resistance, 150 ° C. | | 9.3 lbs. | 6 lbs. | — | 10.3 lbs |

(1)ETFE is ethylene-tetrafluoroethylene copolymer.

What I claim and desire to protect by Letters Patent is:

1. An insulation system for electrical conductors comprising a first layer of radiation crosslinked polymeric insulation in which the polymer is selected from ethylene-tetrafluoroethylene copolymer, ethylene-tetrafluoroethylene terpolymer, and ethylene-chlorotrifluoroethylene copolymer, which polymer has been crosslinked solely by subjecting said polymer to high energy ionizing radiation, said radiation dose being from 3 megarads to 20 megarads, and a coating comprising a heat curable polyimide adherent to the surface of the crosslinked polymeric insulation.

2. The insulation system of claim 1 in which the heat curable polyimide is selected from the group consisting of polymers having a member of the group consisting of benzene and naphthalene rings joined to two carbon atoms of a heterocyclic ring having five to six members in the ring, one to two of the atoms of the heterocyclic ring being nitrogen atoms and the balance of the atoms of the heterocyclic ring being carbon atoms.

3. The insulation system of claim 1 in which the polymer which is irradiation crosslinked is ethylene-tetrafluoroethylene copolymer.

4. The insulation system of claim 1 in which the polymer which is irradiation crosslinked is ethylene-chlorotrifluoroethylene copolymer.

5. The insulation system of claim 1 in which the polymer which is irradiation crosslinked is ethylene-tetrafluoroethylene terpolymer.

6. The insulation system of claims 3, 4 or 5 in which the polyimide is the condensation product of 4,4-oxydianiline and pyromellitic dianhydride.

7. An insulated electrical conductor comprising (a) an electrical conductor, (b) a first layer of crosslinked polymeric insulator surrounding the electrical conductor, said polymer being selected from ethylene-tetrafluoroethylene copolymer, ethylene-tetrafluoroethylene terpolymer, and ethylene-chlorotrifluoroethylene, copolymer, said polymer being crosslinked solely by subjecting said polymer to from 3 megarads to 20 megarads of high energy ionizing radiation, and (c) a heat curable polyimide adherent to the surface of the crosslinked polymeric insulation.

8. The insulated conductor of claim 7 in which the heat curable polyimide is selected from the group consisting of polymers having a member selected from the group consisting of benzene and naphthalene rings joined to two carbon atoms of a heterocyclic ring having five to six members in the ring, one to two of the atoms of the heterocyclic ring being nitrogen atoms and the balance of the atoms of the heterocyclic ring being carbon atoms.

9. The insulated conductor of claim 7 in which the polymer which is irradiation crosslinked is ethylene-tetrafluoroethylene copolymer.

10. The insulated conductor of claim 7 in which the polymer which is irradiation crosslinked is ethylene-chlorotrifluoroethylene copolymer.

11. The insulated conductor of claim 7 in which the polymer which is irradiation crosslinked is ethylene-tetrafluoroethylene terpolymer.

* * * * *